United States Patent [19]

Otsuka et al.

[11] Patent Number: 4,482,855

[45] Date of Patent: Nov. 13, 1984

[54] CURRENT CONTROL APPARATUS FOR ELECTRIC POWER SYSTEMS

[75] Inventors: Kenichi Otsuka, Hamakita; Takeo Shimamura, Tokyo, both of Japan

[73] Assignee: Tokyo Shibaura Denki Kabushiki Kaisha, Kawasaki, Japan

[21] Appl. No.: 495,474

[22] Filed: May 17, 1983

[30] Foreign Application Priority Data

May 26, 1982 [JP] Japan ................................. 57-89168

[51] Int. Cl.³ .............................................. H02P 5/40
[52] U.S. Cl. ................................... 318/809; 318/867; 318/808
[58] Field of Search ............................. 318/807–811, 318/803

[56] References Cited

U.S. PATENT DOCUMENTS 3,824,437  7/1974  Blaschke ............................. 318/803
4,384,244  5/1983  Matsumoto et al. ................. 318/811

OTHER PUBLICATIONS

IEEE IAS Annual Meeting (1980), Nakajima et al., "Reactive Power Reduced Cycloconverter with Bias Voltage at the Neutral Point," pp. 785–790.

IEEE IAS Annual Meeting IAS81=26A pp. 592–599, Oct. 1981 issued by C. D. Schauder, R. Caddy.

*Primary Examiner*—David Smith, Jr.
*Attorney, Agent, or Firm*—Oblon, Fisher, Spivak, McClelland & Maier

[57] ABSTRACT

A current control apparatus includes an instructor for providing a DC amplitude instruction and an AC phase instruction, and a cycloconverter for supplying an induction motor with AC load currents. These load currents are detected by sensors. The sensed signals from the sensors are applied to a detector. The detector generates a DC phase error signal and a DC amplitude signal according to the load currents and the phase instruction. The amplitude instruction, amplitude signal and phase error signal are applied to a comparator circuit. The comparator circuit generates a first voltage instruction and a second voltage instruction. These first and second voltage instructions are applied to a control circuit. The control circuit supplies the cycloconverter with voltage instructions. The comparator circuit, control circuit, cycloconverter, sensors and detector constitute a closed DC feedback control loop which utilizes a vector control method.

11 Claims, 18 Drawing Figures

F I G. 1A
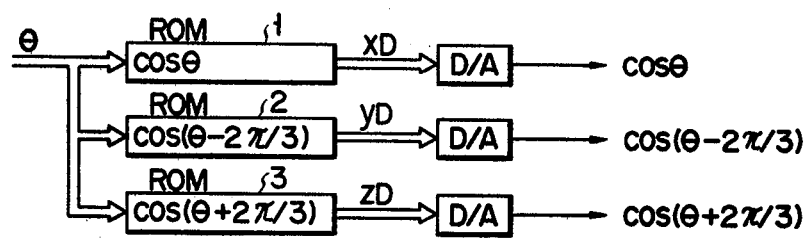
F I G. 1B
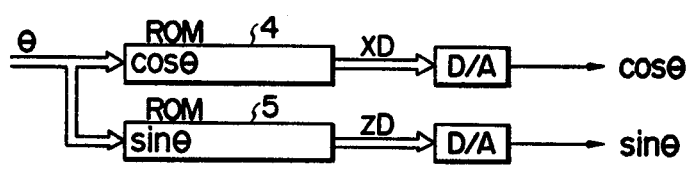
F I G. 2
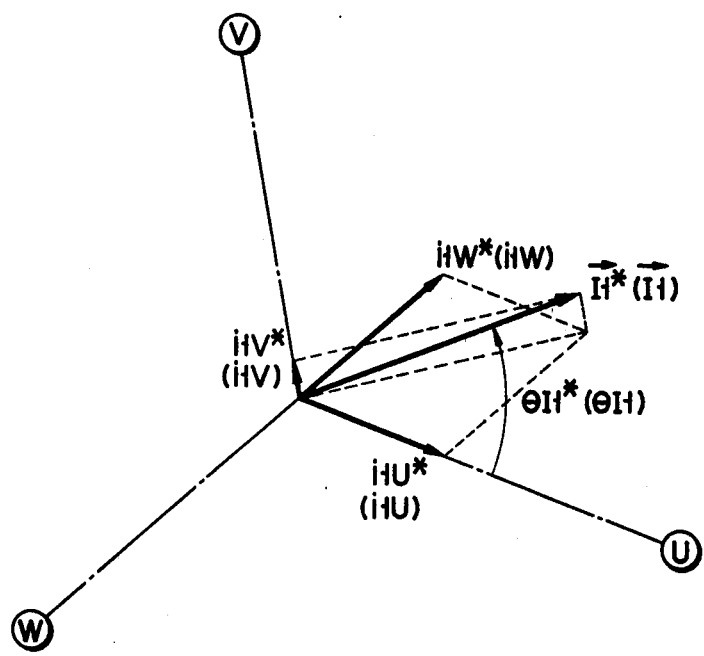

F I G. 3A
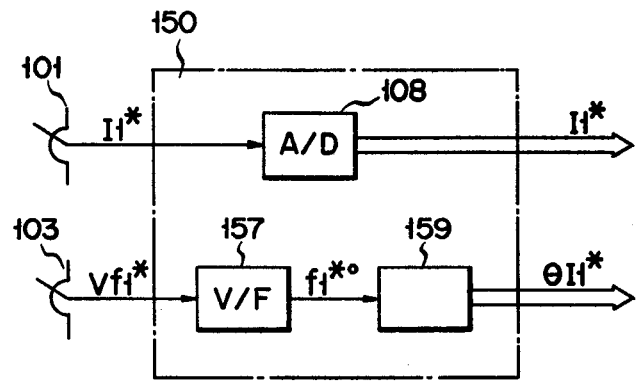
F I G. 3B
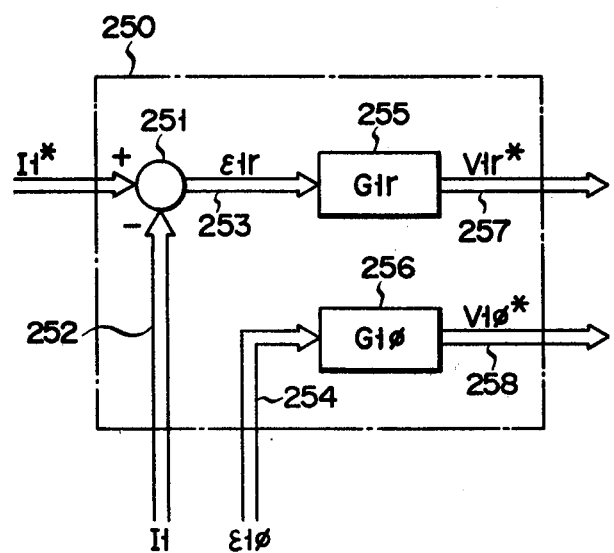

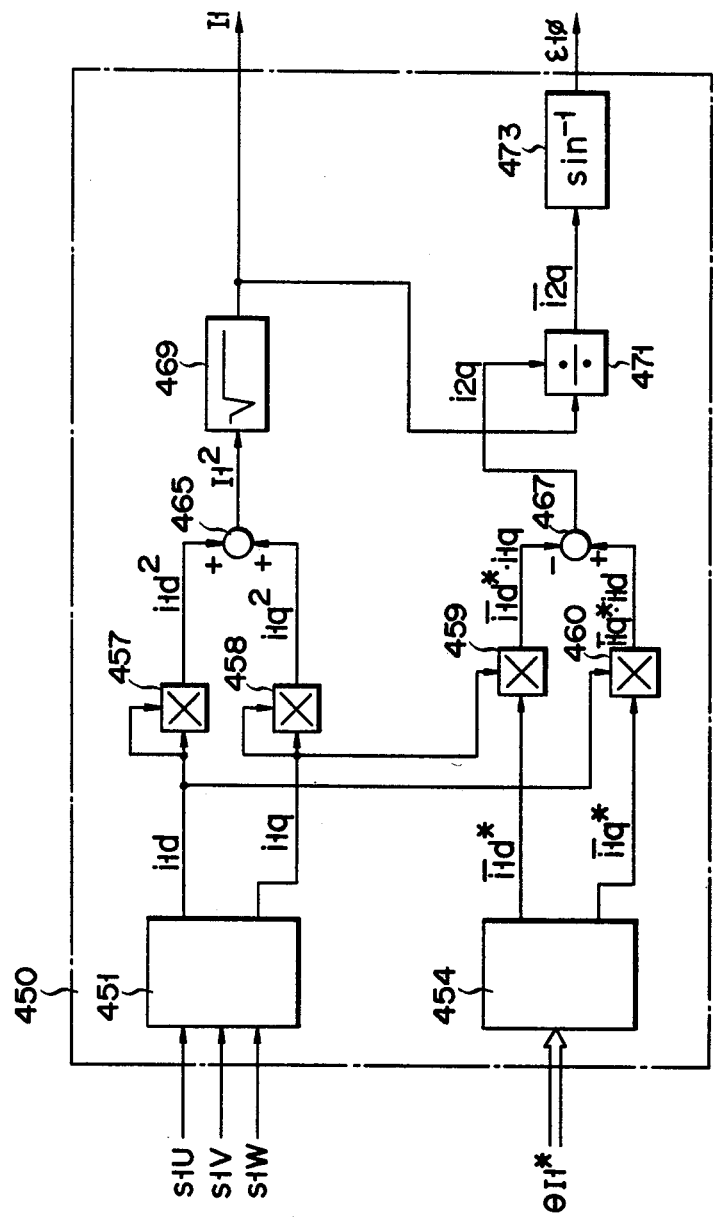
F I G. 5

CURRENT CONTROL APPARATUS FOR ELECTRIC POWER SYSTEMS

BACKGROUND OF THE INVENTION

The present invention relates to a current control apparatus for electric power systems such as an inverter, a cycloconverter and the like. More specifically, this invention relates to a current control apparatus in which phase and amplitude errors between an instruction input data for polyphase currents and actual polyphase currents supplied to a load are avoided.

When a variable frequency alternating current (AC) is supplied to a load by means of an electric power system such as an inverter or cycloconverter, phase and amplitude errors between a control target value and an actual value of load currents cannot be avoided, as well known to a person skilled in the art. Such a prior art problem will be discussed in detail referring to FIG. 1.

FIG. 1 shows a current control apparatus for a conventional cycloconverter which supplies three-phase AC currents to a load. In the configuration of FIG. 1, a current amplitude instructor 101 provides an amplitude instruction I1*. A frequency instructor 103 provides a frequency instruction Vf1* having a voltage which corresponds to an output frequency for the load. A designator 100 generates current instructions for a power converter 10 according to the instructions I1* and Vf1*. A coefficient multiplier 105 multiplies the amplitude instruction I1* by a constant K1. A voltage/frequency (V/F) converter 106 is responsive to the voltage of the frequency instruction Vf1* and generates pulses having a frequency f1*°. The frequency f1*° is proportional to a target output frequency of the cycloconverter. A counter 109 counts the pulse of frequency f1*° to generate a digital AC phase signal $\theta I1^*$ whose contents are periodically circulated. Here, the contents of signal $\theta I1^*$ designate the phase angles of currents to be outputted from the cycloconverter. The AC phase signal $\theta I1^*$ is applied to a function circuit 111 and circuit 111 generates three-phase unit current instructions $\overline{i1U^*}$, $\overline{i1V^*}$ and $\overline{i1W^*}$. These instructions may be represented as:

$$\left.\begin{array}{l} \overline{i1U^*} = \cos\theta I1^* \\ \overline{i1V^*} = \cos(\theta I1^* - 2\pi/3) \\ \overline{i1W^*} = \cos(\theta I1^* + 2\pi/3) \end{array}\right\} \quad (1)$$

Each of the unit current instructions $\overline{i1U^*}$ to $\overline{i1W^*}$ and output signal K1I1* of the coefficient multiplier 105 is independently multiplied by multipliers 116 to 118, and AC current instructions i1U*, i1V* and i1W* are obtained from multipliers 116, 117 and 118, respectively. Thus, instructions i1U*, i1V* and i1W* may be represented as:

$$\left.\begin{array}{l} i1U^* = K1I1^* \cos\theta I1^* \\ i1V^* = K1I1^* \cos(\theta I1^* - 2\pi/3) \\ i1W^* = K1I1^* \cos(\theta I1^* + 2\pi/3) \end{array}\right\} \quad (2)$$

FIGS. 1A and 1B show typical configurations of function circuit 111. FIG. 1A is directed to a three-phase configuration and FIG. 1B is directed to a two-phase configuration. In FIG. 1A a digital input $\theta$ designates a specific address of ROMs 1 to 3 each of which stores cosine function values. According to the contents of input $\theta$, digital function values xD, yD and zD are outputted from ROMs 1, 2 and 3, respectively. These values xD, yD and zD are converted into analog signals $\cos\theta$, $\cos(\theta - 2\pi/3)$ and $\cos(\theta + 2\pi/3)$ via D/A converters. In FIG. 1B a digital input $\theta$ designates a specific address of a ROM 4 which stores cosine function values, and also designates a specific address of a ROM 5 which stores sine function values. Then ROMs 4 and 5 output function values xD and zD, respectively, and these values xD and zD are converted into an analog cosine signal and sine signal by D/A converters.

In FIG. 1, power converter 10 including a control circuit 200 and a cycloconverter 500 supplies a load 600 with AC currents i1U to i1W according to the contents of AC current instructions i1U* to i1W*. Comparators 201, 202 and 203 compare the current instructions i1U*, i1V* and i1W* with the detected values (s1U, s1V and s1W) of load currents i1U, i1V and i1W, respectively, and independently produce error signals $\epsilon1U$, $\epsilon1V$ and $\epsilon1W$. Amplifiers 207, 208 and 209 amplify the error signals $\epsilon1U$, $\epsilon1V$ and $\epsilon1W$ to provide AC voltage instructions v1U*, v1V* and v1W*.

The cycloconverter 500 generates three-phase AC voltages V1U, V1V and V1W according to the contents of AC voltage instructions v1U*, v1V* and v1W*. These AC voltages V1U, V1V and V1W are applied to windings U, V and W of a three-phase induction motor or load 600. When voltages V1U to V1W are applied to the load 600, load currents i1U to i1W corresponding to these voltages flow. Load currents i1U, i1V and i1W are detected by current sensors 507, 508 and 509, respectively. Each of the sensors 507 to 509 isolatedly detects the load currents i1U to i1W, and generates AC load current signals s1U to s1W. Signals s1U, s1V and s1W respectively represent the load currents i1U, i1V and i1W, and the sign of each of the signals s1U to s1W is identical with the sign of each of the currents i1U to i1W. Load current signals s1U, s1V and s1W are fed back to the comparators 201, 202 and 203, respectively.

According to a prior art apparatus having such a configuration as mentioned above, AC current instructions i1U* to i1W* outputted from designator 100 are compared with AC load current signals s1U to s1W in a closed control loop; thus, the load currents i1U to i1W of load 600 depend on the value of AC current instructions i1U* to i1W* (here, for brevity's sake, no consideration is given to possible ripples in the output of the cycloconverter).

FIG. 2 illustrates the relations between an input of the designator 100 (instruction vector $\overline{I1}$) and each of AC current instructions i1U* to i1W*. In this figure the symbols U, V and W denote the geometrical phase positions of windings of the load 600. When actual currents i1U to i1W corresponding to the instructions i1U* to i1W* (Eq.(2)) flow into the windings U to W of load 600, a current vector $\overline{I1}$ obtained by composing the vector components of currents i1U to i1W is generated in the load 600. The current vector $\overline{I1}$ becomes identical with an instruction vector $\overline{I1}^*$ according to a feedback operation, and the vector $\overline{I1}^*$ is obtained by composing the instructions i1U* to i1W*.

The current vector $\overline{I1}^*$ has a constant amplitude (=I1*) and a variable phase angle $\theta I1^*$ which is defined in reference to the phase axis of winding U. Angle $\theta I1^*$ corresponds to the frequency instruction Vf1*. The rate of change of the phase angle $d\theta I1^*/dt$, or the angular frequency of $\theta I1^*$, is constant unless instruction Vf1* is changed. The actuation of load 600 depends on the current vector $\overline{I1}^*$, and the vector $\overline{I1}^*$ may be reduced to its vector components i1U* to i1W*. This means that the actuation of load 600 can be controlled by current instructions i1U* to i1W*. Thus, the instruction I1* of FIG. 1 designates the amplitude of current vector $\overline{I1}^*$ of FIG. 2, and the phase signal $\theta I1^*$ of FIG. 1 designates the phase angle $\theta I1^*$ of vector I1*. Threephase (polyphase) AC current instructions i1U* to i1W* of Eq.(2) are produced in a manner such that first, angle data $\theta I1^*$ is generated from elements 106 and 109 according to the frequency instruction Vf1*; second, polyphase unit current instructions $\overline{i1U}^*$ to $\overline{i1W}^*$ are generated from function circuit 111 according to the angle data $\theta I1^*$; and finally the amplitude of said instructions i1U* to i1W* are controlled by multipliers 116 to 118 according to the amplitude data I1*.

The configuration of FIG. 1 has a substantial disadvantage. The current control apparatus of FIG. 1 depends on an AC feedback control system in which AC current instructions i1U* to i1W* and AC load current signals s1U to s1W are respectively compared with one another to generate AC error signals $\epsilon$1U to $\epsilon$1W. As is known, an AC feedback control system contains a phase delay element. Then, the frequency response of a closed loop of an AC feedback control system shows a level down and a phase delay in a high frequency region with reference to an AC instruction applied to the control system, and such level down and phase delay become more and more conspicuous as the signal frequency becomes higher. Thus, stationary errors of amplitude and phase in the AC feedback control system increase as the frequency designated by the instruction Vf1* increases.

Where a cycloconverter is utilized in the current control system, as shown in FIG. 1, the cycloconverter generates output currents with large ripples, and amplifiers 207 to 209 suffer a disadvantage due to ripples of the output currents. Large ripples induce an unstable feedback operation. Thus, amplifiers 207 to 209 must have filtering elements for effectively stabilizing the current controllability of the cycloconverter. Because of the substantial phase delay and high-cut frequency characteristic of filtering elements, when the output current frequency becomes high, phase and amplitude errors between the AC current instructions and the actual load currents become serious. Such a problem is discussed in detail in a paper of:

NATIONAL CONVENTION RECORDS OF THE INSTITUTE OF ELECTRICAL ENGINEERS OF JAPAN, 1981, No. 563, pp. 685-686.

Currently, an attempt is being made to vector-control the operation of an induction motor by means of a variable frequency power source, e.g., a power converter using a cycloconverter. Such a power converter requires that each of its output currents exactly correspond to a current instruction in both stationary and transient states without any phase and amplitude errors. Accordingly, a special current control apparatus, which is free from phase and amplitude errors between a current instruction and each of the actual polyphase AC currents supplied to a load, is strongly desired.

SUMMARY OF THE INVENTION

It is accordingly the object of the present invention to provide a current control apparatus for electric power systems in which stationary phase and amplitude errors between a current instruction input and each of the actual polyphase AC load currents are eliminated.

A further object of the invention is to provide a current control apparatus which is not only free from stationary phase and amplitude errors but also possesses good transient response characteristics.

The present invention is derived from the following concept.

An AC feedback control system generally has a certain phase error between a control instruction value and an actual controlled value, even in a stationary state. On the other hand, a certain DC feedback control system can completely avoid the phase error of an AC control system. This is because in a DC control system, a control instruction input and a feedback signal representing an actual load current are both DC, and thus, a detected error signal for feedback control is also DC. DC does not depend on the frequency of the load current.

Further, when the DC feedback loop includes an integration element, it is also possible to avoid a stationary amplitude error between the control instruction input and the actual load current.

A frequency-free DC data for the DC feedback control is obtained by utilizing a relation:

$$A^2 \sin^2 \omega t + A^2 \cos^2 \omega t = A^2 \text{(constant)}$$

where $\omega$ denotes an angular frequency of the AC load current and t denotes time. Data $A(=\sqrt{*A^2})$ indicates the amplitude of AC load current but is independent of the AC component or time component. That is, data A or $A^2$ is a kind of DC. A frequency-free DC phase error data for the DC feedback control is obtained from the phase difference between an AC load current and an AC control instruction whose angular frequency is the same as that of the AC load current. The frequency-free DC amplitude data (Eq.(12)) can be independent of the frequency-free DC phase error data (Eq.(3)).

Still further, according to one important aspect of the invention, a control instruction is divided H into an AC phase instruction $\theta I1^*$ and a DC amplitude instruction I1*. Then, the AC phase component $\theta I1$ of a detected actual load current and the DC amplitude component I1 thereof are respectively and independently compared with the AC phase instruction $\theta I1^*$ and the DC amplitude instruction I1*. By doing so, it is possible to completely separate a transfer function of the phase error from a transfer function of the amplitude error. This enables independent approaches for improving an amplitude control response and for improving a phase control response, resulting in relatively simple configurations for an excellent load current control.

To achieve the object of the invention, a current control apparatus for electric power systems comprises: first means for providing an amplitude instruction (I1*) and a phase instruction ($\theta I1^*$); second means responsive to voltage instructions (v1U*-v1W*) for supplying a load with AC load currents (i1U-i1W); third means for generating a phase error signal ($\epsilon 1\phi$) according to the phase instruction ($\theta I1^*$), and for generating an amplitude signal (I1) according to the AC load currents (i1U-i1W); fourth means for generating a first voltage instruction (V1r*) which corresponds to the difference between the amplitude instruction (I1*) and the amplitude signal (I1), and for generating a second voltage instruction (V1φ*) which corresponds to the phase error signal (ε1φ); and fifth means for generating the voltage instruction (v1U*-v1W*) according to the first and second voltage instructions (V1r*, V1φ*).

The amplitude instruction (I1*) is DC and the phase instruction (θI1*) is AC. The phase error signal (ε1φ) corresponds to the phase difference between a phase angle (θI1) of a composed vector ($\overline{I1}$) of the AC load currents (i1U-i1W) and that of the phase instruction (θI1*), and the phase difference (θI1*-θI1) becomes DC.

The amplitude signal (I1) corresponds to the sum (i1d$^2$+i1q$^2$) of the square of a cosine component (i1d) of the AC load currents (i1U-i1W) and the square of a sine component (i1q) of the AC load currents (i1U-i1W).

BRIEF DESCRIPTION OF THE DRAWINGS

FIG. 1A shows a configuration of a function circuit 111 (FIG. 1) of a three-phase type;

FIG. 1B shows a configuration of a function circuit 111 of a two-phase type;

FIG. 2 is a vector graph explaining the relation among polyphase current vectors and the composed vector of these current vectors of FIG. 1;

FIG. 3A shows a configuration of a digital designator 150 used in the apparatus of FIG. 3;

FIG. 3B shows a digital comparator circuit 250 used in the apparatus of FIG. 3;

FIG. 5 shows details of a detector 450 (analog type) used in the apparatus of FIG. 3;

DETAILED DESCRIPTION OF THE PREFERRED EMBODIMENT

Now, description will be given of the preferred embodiment of the invention.

Figure 3:
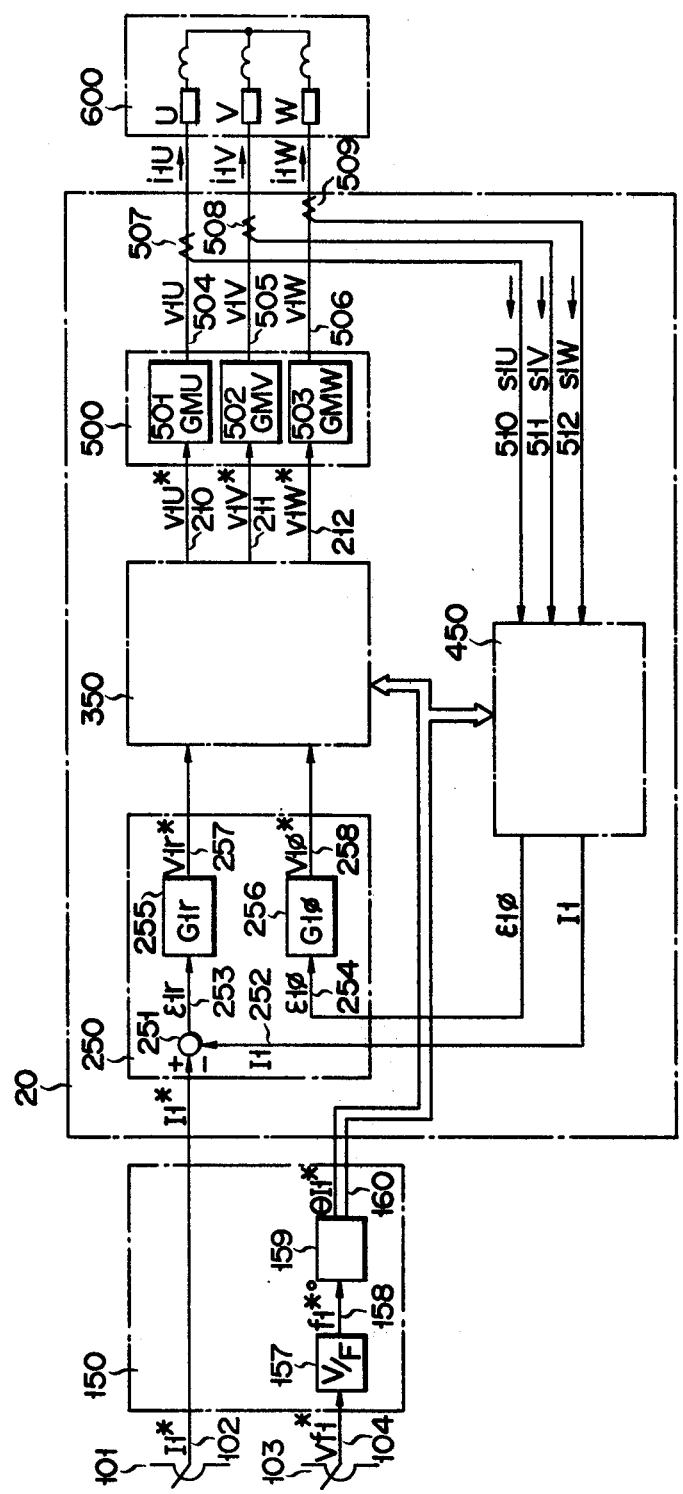
FIG. 3 shows a configuration of a current control apparatus according to the present invention which utilizes a DC feedback control system.

FIG. 3 is a block configuration of a current control apparatus of the invention. This current control apparatus is used for power-supplying a three-phase load 600 with three-phase AC currents. The configuration of FIG. 3 is directed to a specific apparatus for electric power systems utilizing said vector control method, and such an apparatus has a bright future.

Figure 9:
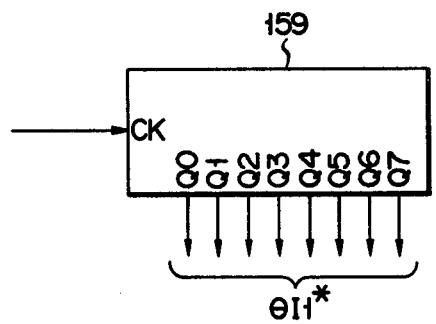
FIG. 9 shows a configuration of counter 159 used in the apparatus shown in FIG. 3.
Figure 10:
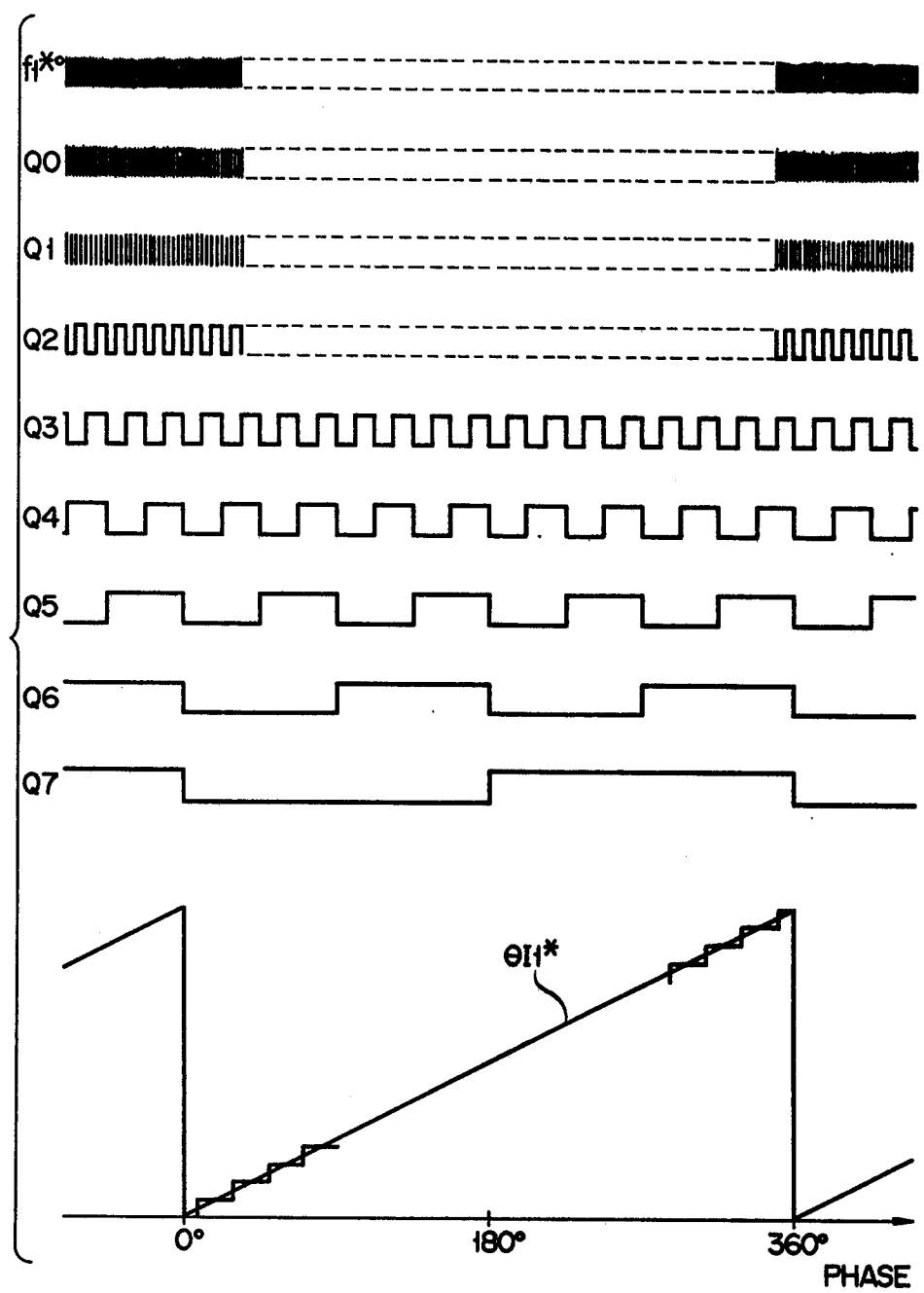
FIG. 10 shows the waveform of signals outputted from the counter 159 of FIG. 9.

A current amplitude designator 101 provides an analog amplitude instruction (reference of amplitude) I1*. A frequency designator 103 provides an analog voltage Vf1* corresponding to the output frequency of the current control apparatus. Voltage Vf1* is applied via a signal line 104 to a voltage/frequency (V/F) converter 157. V/F converter 157 oscillates at a given frequency f1*° corresponding to the DC potential of voltage Vf1*. A pulse having the frequency f1*° is applied via a signal line 158 to a counter 159. Counter 159 counts the inputted pulses to generate a digital phase instruction (reference of phase) θI1* whose contents are periodically circulated, i.e., the instruction θI1* is a kind of AC. Counter 159 may be an 8-bit binary counter as shown in FIG. 9, whose eight outputs Q0 to Q7 provide the AC phase instruction θI1*. Thus, as shown in FIG. 10, the level-change pattern of instruction θI1* is a staircase pattern which has $2^8$ kinds of level steps, and one circulation period of the staircase form is equal to $2^8$ periods of the frequency f1*°.

The elements 157 and 159 form an instructor 150 for providing a DC amplitude instruction I1* and an AC phase instruction θI1*.

Figure 6:
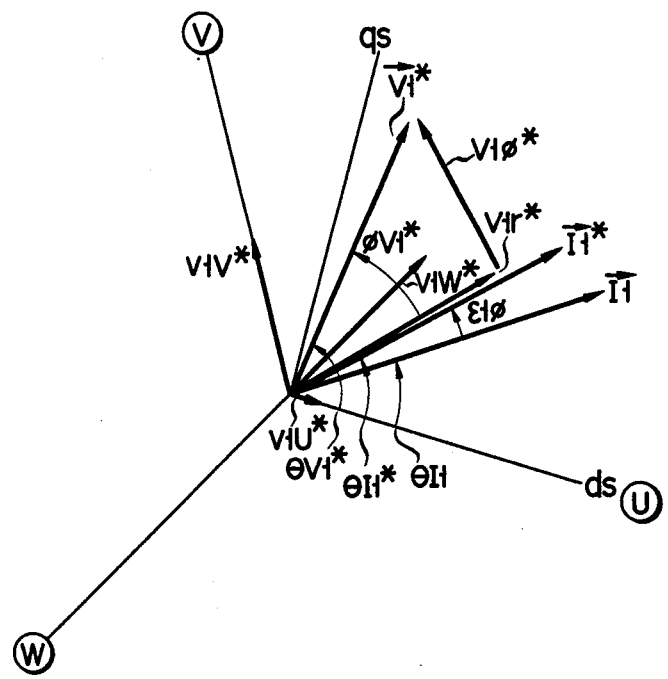
FIG. 6 is a vector graph explaining the relation among a current instruction vector ($\overline{I1^*}$), a composed vector ($\overline{I1}$) of polyphase load current vectors, a first voltage instruction vector (V1r*), a second voltage instruction vector (V1φ*) and the composed vector ($\overline{V1^*}$) of these voltage instruction vectors.

Amplitude instruction I1* is applied via a signal line 102 to the positive input of a comparator 251 whose negative input receives a feedback signal (DC amplitude signal) I1. Signal I1 is DC and its DC potential indicates the amplitude of AC load currents. Comparator 251 compares the potential of signal I1 with that of instruction I1* and generates a DC phase error signal ε1r which corresponds to the DC potential difference of I1* and I1. Signal ε1r is applied via a signal line 253 to an amplifier 255 having a transfer function G1r. Amplifier 255 amplifies the signal ε1r by G1r, thus providing a first voltage instruction V1r*. This instruction V1r* form a signal pair with a second voltage instruction V1φ*. Instruction V1φ* is obtained from an amplifier 256 having a transfer function G1φ. Amplifiers 255 and 256 may be a PI (Proportion & Integration) type. Amplifier 256 amplifies a DC phase error signal ε1φ by G1φ to provide the instruction V1φ*. Here, suppose that θI1 denotes a phase angle of a composed current vector $\overline{I1}$ of actual load currents (FIG. 6). Then, the following equation holds:

$$\epsilon 1\phi = \theta I1^* - \theta I1 \quad (3)$$

In Eq.(3) data θI1* and θI1 contain a time component and therefore are a kind of AC. However, when the angular frequency of data θI1* is the same as that of data θI1, the difference between θI1* and θI1 indicates no frequency dependency. Thus, data ε1φ is a kind of DC. Data ε1φ is varied when data θI1 changes. Accordingly, data ε1φ is DC information indicating the change of data θI1. Signals I1 and ε1φ are supplied via signal lines 252 and 254 from a detector 450 which will be mentioned later in detail.

The elements 251, 255 and 256 form a comparator circuit 250 for generating first and second voltage instructions V1r* and V1φ* according to instruction I1* and signals I1 and ε1φ.

Voltage instructions V1r* and V1φ* are applied via signal lines 257 and 258 to a control circuit 350. Circuit 350 receives said phase instruction θI1* via a data line 160 and generates voltage instructions v1U*, v1V* and v1W* for three-phase AC according to instructions θI1*, V1r* and V1φ*. Details of the configuration of circuit 350 will be described later.

Voltage instructions v1U*, v1V* and v1W* are applied respectively via signal lines 210, 211 and 212 to a three-phase cycloconverter 500. Cycloconverter 500 generates three-phase AC voltages V1U, V1V and V1W. These voltages V1U, V1V and V1W are applied via power lines 504, 505 and 506 to terminals U, V and W of an induction motor (load) 600. AC load currents i1U, i1V and i1W from the cycloconverter 500 and applied to the terminals U, V and W of motor 600 are sensed by current sensors 507, 508 and 509. Sensors 507, 508 and 509 output signals s1U, s1V and s1W, respectively. These signals s1U to s1W are applied via signal lines 510 to 512 to the detector 450. Detector 450 receives said amplitude instruction θI1* and generates said DC signals ε1φ and I1 according to the signals s1U to s1W and the instruction θI1*.

The elements 250, 350, 500, 507 to 509 and 450 form a main control part 20 of the present invention.

The instructor 150 and comparator 250 shown in FIG. 3 are analog/digital type. FIGS. 3A and 3B show a digital configuration of the instructor 150 and comparator 250. In FIG. 3A, an analog DC voltage I1* is converted into a digital DC instruction I1* by an A/D converter 108 and an analog DC voltage Vf1* is converted into a digital AC phase instruction θI1* by a V/F converter 157 and a counter 159. In FIG. 3B, the digital DC instruction I1* is compared with a digital DC feedback signal I1 by a digital comparator 251, and comparator 251 supplies a digital multiplier 255 with a digital DC error signal ε1r. Multiplier 255 outputs a digital instruction V1r* corresponding to ε1rG1r. Similarly, a digital DC phase error signal ε1φ is multiplied by a digital multiplier 256 and changed to a digital DC instruction V1φ* corresponding to ε1φG1φ. When the configurations of FIGS. 3A and 3B are used, the control circuit 350 and the detector 450 of FIG. 3 are, of course, digital type.

Figure 4:
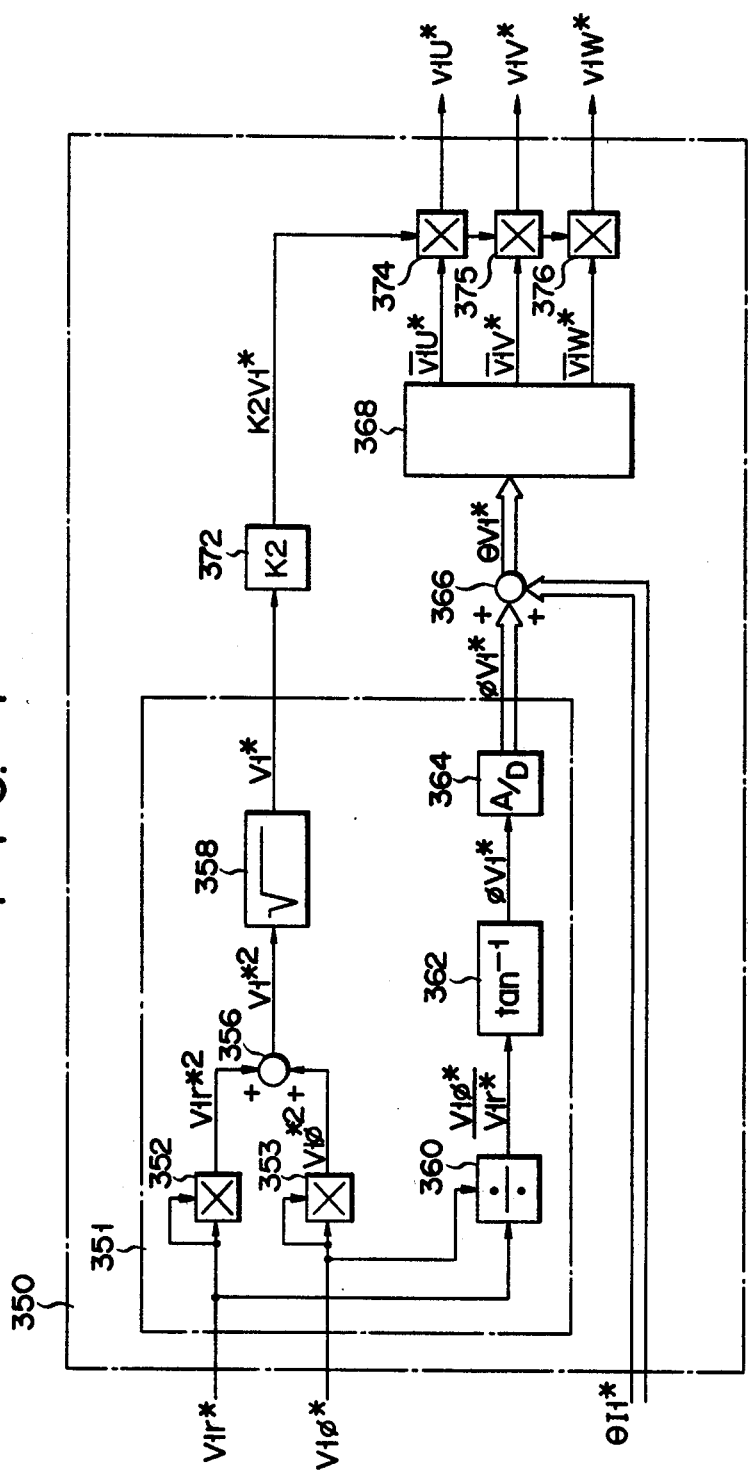
FIG. 4 shows the details of a control circuit 350 (analog/digital hybrid type) used in the apparatus of FIG. 3.

FIG. 4 shows details of an analog/digital hybrid type control circuit 350. The first voltage instruction V1r* is inputted to a square multiplier 352, and the second voltage instruction V1φ* is inputted to a square multiplier 353. Multiplier 352 squares the inputted voltage to generate a first squared instruction V1r*², and multiplier 353 squares the inputted voltage to generate a second squared instruction V1φ*². Instructions V1r*² and V1φ*² are added by an adder 356. Adder 356 supplies a root function circuit 358 with an added squared signal V1*². Circuit 358 extracts the square root of the signal V1*² to provide an amplitude component V1* of the voltage instruction vector $\overline{V1^*}$. Thus, the following relation holds:

$$V1^* = \sqrt{V1r^{*2} + V1\phi^{*2}} \quad (4)$$

The component V1* is multiplied by K2 by a coefficient multiplier 372. Multiplier 372 outputs a multiplied component K2V1* (DC).

Instructions V1r* and V1φ* are applied to a divider 360. Divider 360 divides the instruction V1φ* by the instruction V1r*, thereby providing a divided instruction V1φ*/V1r*. Instruction V1φ*/V1r* is functionally converted by an arctangent circuit 362 into an angular component φV1* of the voltage instruction vector $\overline{V1^*}$. Thus, the following relation holds:

$$\phi V1^* = \tan^{-1}(V1\phi^*/V1r^*) \quad (5)$$

The analog angular component φV1* is converted into a digital angular component φV1* by an A/D converter 364. The digital component φV1* and the digital phase instruction θI1* are added by a digital adder 366. Adder 366 outputs a digital phase angle instruction θV1* which indicates the phase angle of the voltage instruction vector $\overline{V1^*}$. Thus, the following relation holds:

$$\theta V1^* = \theta I1^* + \phi V1^* \quad (6)$$

Figure 1:
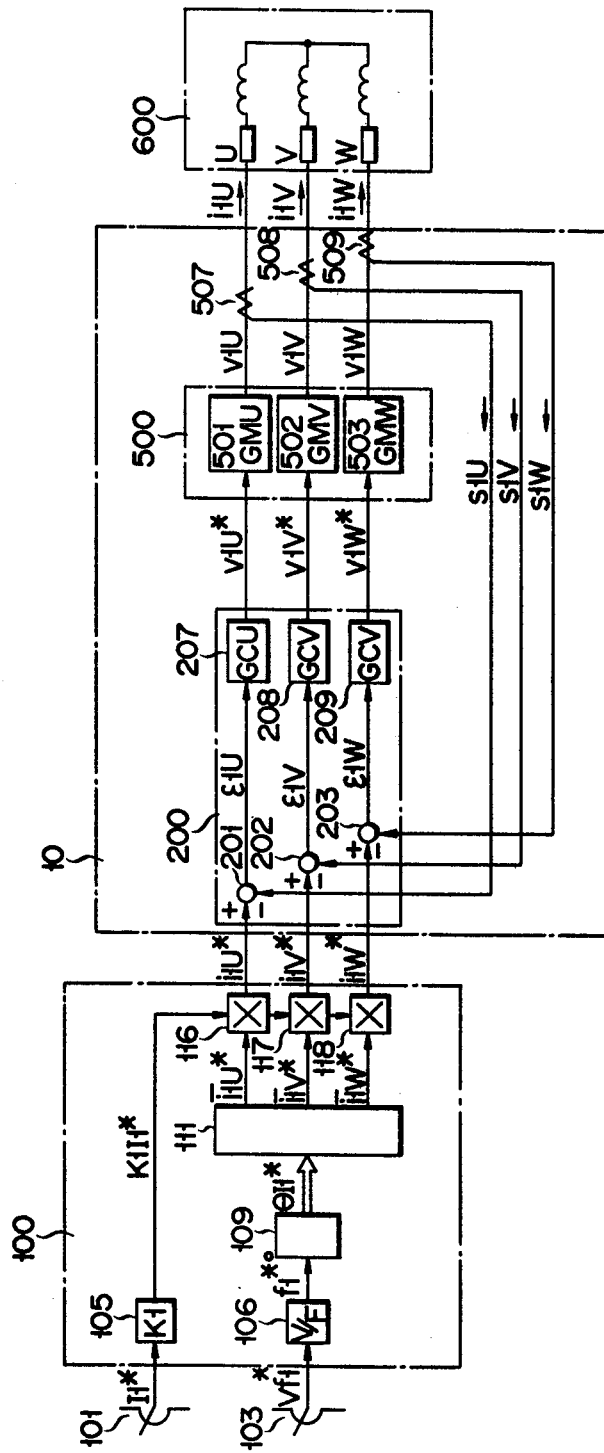
FIG. 1 shows a configuration of a prior art current control apparatus which utilizes an AC feedback control system.

Instruction θV1* is applied to a function circuit 368. The configuration of circuit 368 may be one as shown in FIG. 1A. Circuit 368 generates unit AC voltage instructions $\overline{v1U^*}$, $\overline{v1V^*}$ and $\overline{v1W^*}$. Here, these instructions are defined as:

$$\left. \begin{array}{l} \overline{v1U^*} = \cos\theta V1^* \\ \overline{v1V^*} = \cos(\theta V1^* - 2\pi/3) \\ \overline{v1W^*} = \cos(\theta V1^* + 2\pi/3) \end{array} \right\} \quad (7)$$

Instructions $\overline{v1U^*}$, $\overline{v1V^*}$ and $\overline{v1W^*}$ are applied to multipliers 374, 375 and 376, respectively. Each of multipliers 374 to 376 receives said multiplied component K2V1* from the multiplier 372. Then, multipliers 374 to 376 generate the AC voltage instructions v1U* to v1W*. Here, these instructions are defined as:

$$\left. \begin{array}{l} v1U^* = K2V1^* \cos\theta V1^* \\ v1V^* = K2V1^* \cos(\theta v1^* - 2\pi/3) \\ v1W^* = K2V1^* \cos(\theta V1^* + 2\pi/3) \end{array} \right\} \quad (8)$$

Figure 4A:
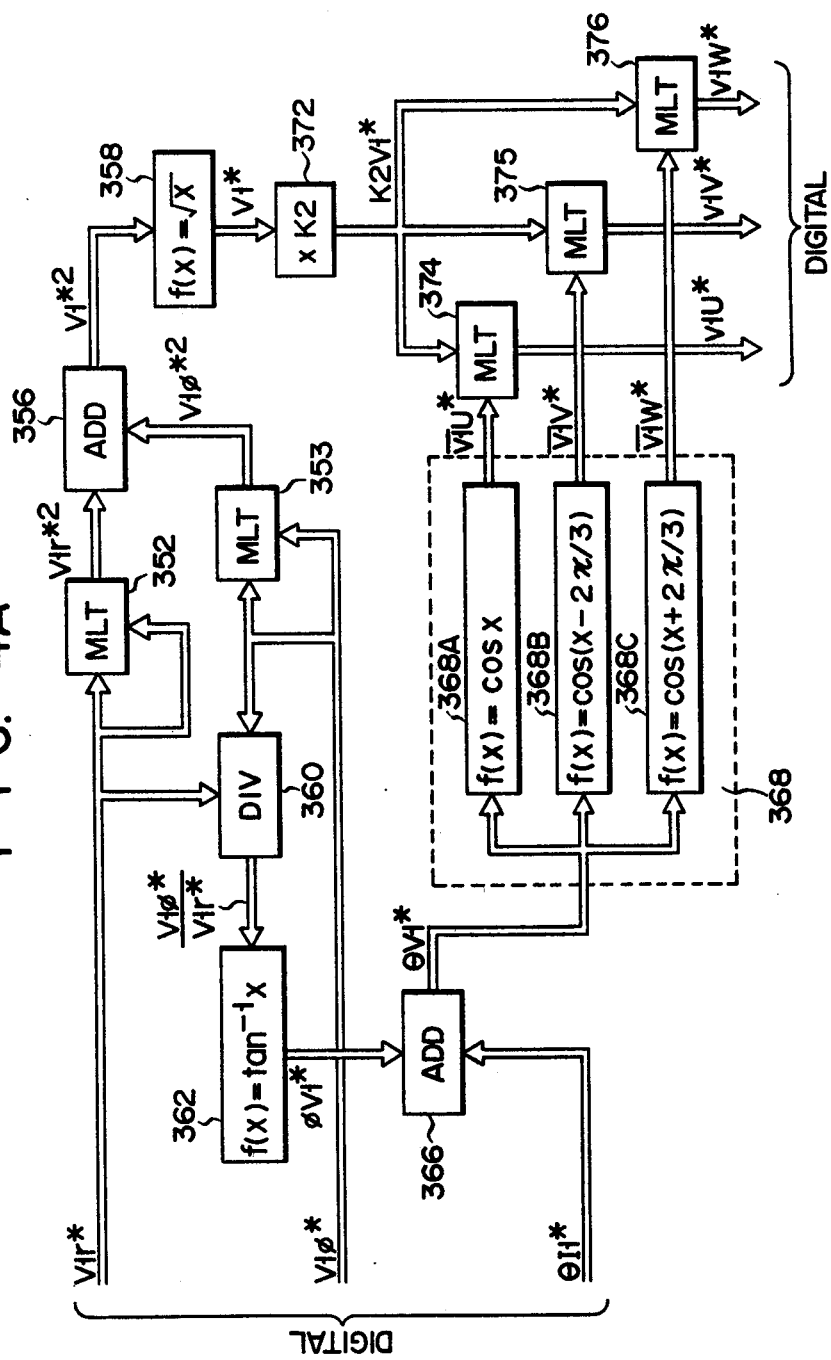
FIG. 4A is a modification (digital type) of the control circuit 350.

FIG. 4A shows a complete digital type control circuit 350. Digital output data V1r* of the multiplier 255 (FIG. 3B) is applied to a digital square multiplier 352, and digital output data V1φ* of the multiplier 256 (FIG. 3B) is applied to a digital square multiplier 353. Multipliers 352 and 353 supply a digital adder 356 with squared data V1r*² and V1φ*², respectively. Adder 356 supplies a digital root function circuit 358 with added squared data V1*². Circuit 358 extracts the squared root of the data V1*² and provides data V1* which represents the amplitude component of the vector $\overline{V1^*}$. (FIG. 6). Data V1* is applied to a digital coefficient multiplier 372 and multiplied by a constant K2. Multiplier 372 supplies three digital multipliers 374, 375 and 376 with the multiplied data K2V1*.

Data V1r* and V1φ* are applied to a digital divider 360. Divider 360 supplies a digital arctangent circuit 362 with a divided data V1φ*/V1r*. Circuit 362 generates angle data φV1*. When the circuit 362 is formed of a ROM, data V1φ*/V1r* designates a specific address of the ROM and the corresponding angle data φV1* is read out of the designated specific address. Data φV1* is applied to a digital adder 366. Adder 366 receives the digital output data θI1* from counter 159 (FIG. 3A)

and outputs digital phase angle data $\theta V1^*$ which indicates the phase angle of the vector $\overline{V1^*}$ (FIG. 6). Data $\theta V1^*$ is applied to a digital function circuit 368 which is formed of three ROMs 368A, 368B and 368C. Each address of ROMs 368A to 368C is designated by the data $\theta V1^*$.

ROM 368A converts the data $\theta V1^*$ into unit voltage data $\overline{v1U^*}$ according to a relation "f(x)=cos x". ROM 368B converts the data $0V1^*$ into unit data $\overline{v1V^*}$ according to a relation "$f(x)=\cos(x-2\pi/3)$". ROM 368C converts the data $\theta V1^*$ into unit voltage data $v1W^*$ according to a relation "$f(x)=\cos(x+2\pi/3)$". Data $\overline{v1U^*}$, $\overline{v1V^*}$ and $\overline{v1W^*}$ are applied to the multipliers 374, 375 and 376. Then, multipliers 374, 375 and 376 provide digital AC voltage data v1U*, v1V* and v1W*, respectively.

Figure 5A:
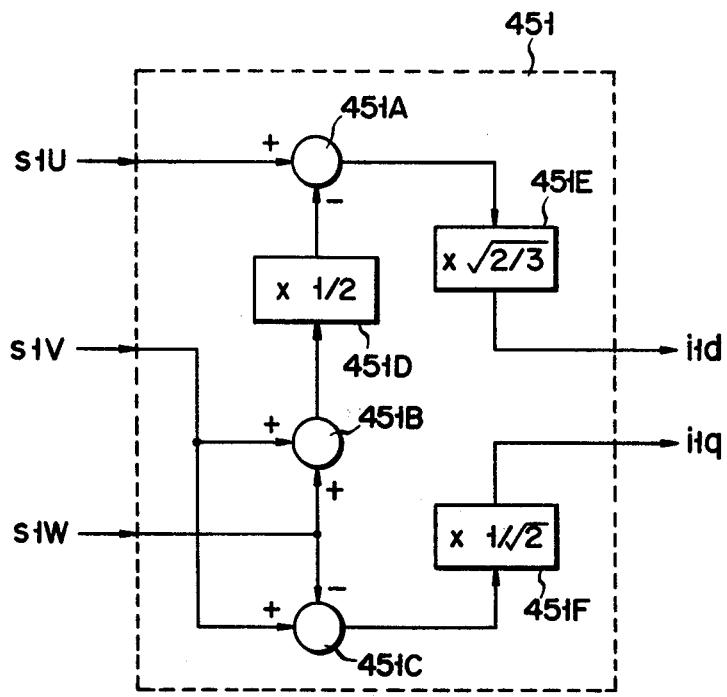
FIG. 5A shows a configuration of an arithmetic operation circuit 451 shown in FIG. 5.

FIG. 5 shows details of an analog detector 450 of FIG. 3. Analog signals s1U, s1V and s1W from the sensors 507, 508 and 509 (FIG. 3) are applied to an arithmetic unit 451 having a configuration as shown in FIG. 5A. In FIG. 5A, the signal s1U is applied to a subtracter 451A, signal s1V is applied to an adder 451B and to a subtracter 451C, and signal s1W is applied to adder 451B and to subtracter 451C. Adder 451B outputs a signal [s1V+s1W]. The signal [s1V+s1W] is divided by 2 by a divider 451D, and a signal [(s1V+s1W)/2] is applied as a subtracting signal to the subtracter 451A. Subtracter 451A outputs a signal [s1U−(s1V+s1W)/2] which is multiplied by $\sqrt{2/3}$ at a multiplier 451E and becomes a first axis component (cosine component) i1d of a sensed load current IM of the load 600. Subtracter 451C outputs a signal [s1V−s1W]. Signal [s1V−s1W] is divided by $\sqrt{2}$ at a divider 451F and becomes a second axis component (sine component) i1q of the load current IM.

Here, the sensed signals s1U, s1V and s1W are represented as:

$$\left.\begin{array}{l} s1U = IM \cos \theta I1 \\ s1V = IM \cos(\theta I1 - 2\pi/3) \\ s1W = IM \cos(\theta I1 + 2\pi/3) \end{array}\right\} \quad (9)$$

Then, the components i1d and i1q may be expressed as:

$$\left.\begin{array}{l} i1d = \sqrt{2/3}\ [s1U - (s1V + s1W)/2] \\ \quad = \sqrt{3/2}\ IM \cos \theta I1 \\ i1q = 1/\sqrt{2}\ [s1V - s1W] \\ \quad = \sqrt{3/2}\ IM \sin \theta I1 \end{array}\right\} \quad (10)$$

Figure 5B:
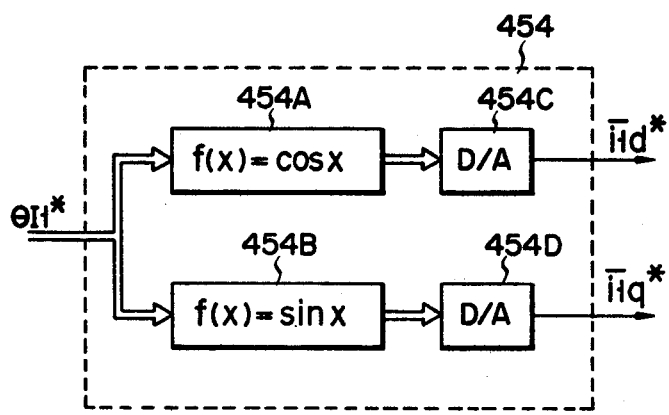
FIG. 5B shows a configuration of a function circuit 454 shown in FIG. 5.

In FIG. 5, the phase instruction $\theta I1^*$ from counter 159 (FIG. 3) is applied to a function circuit 454 having a configuration as shown in FIG. 5B. In the circuit 454, instruction $\theta I1^*$ is applied as an address data to ROMs 454A and 454B. ROM 454A converts the data $\theta I1^*$ into digital unit cosine data $\overline{i1d^*}$ according to a relation "f(x)=cos x". ROM 454B converts the inputted data $\theta I1^*$ into digital unit sine data $\overline{i1q^*}$ according to a relation "f(x)=sin x". Thus, the following relations holds:

$$\left.\begin{array}{l} \overline{i1d}^* = \cos \theta I1^* \\ \overline{i1q}^* = \sin \theta I1^* \end{array}\right\} \quad (11)$$

Digital data $\overline{i1d^*}$ and $\overline{i1q^*}$ are respectively converted into analog signals $\overline{i1d^*}$ and $\overline{i1q^*}$ by D/A converters 454C and 454D.

Again, in FIG. 5, components i1d and i1q are applied to square multipliers 457 and 458, respectively. Multipliers 457 and 458 supply an adder 465 with squared signals i1d$^2$ and i1q$^2$. Adder 465 supplies a root function circuit 469 with a squared signal I1$^2$ corresponding to i1d$^2$+i1q$^2$. Circuit 469 extracts the square root of the signal I1$^2$ to provide an actual amplitude component I1. Thus, from Eq.(10) and the relation "$I1^2=i1d^2+i1q^2$", the following relation is derived:

$$I1 = \sqrt{i1d^2 + i1q^2} = \sqrt{3/2}\ IM \quad (12)$$

The component i1q and the data $\overline{i1d^*}$ are applied to a multiplier 459, and the compnent i1d and the data $\overline{i1q^*}$ are applied to a multiplier 460. Multiplier 459 generates a multiplied data $\overline{i1d^*}$i1d. Date $\overline{i1d^*}$i1q is subtracted from data $\overline{i1q^*}$i1d by a subtracter 467. Subtracter 467 provides a divider 471 with a subtracted data i2q corresponding to "$\overline{i1q^*}$i1d−$\overline{i1d^*}$i1q". Divider 471 receives the component I1 from circuit 469 and outputs a data $\overline{i2q}$ corresponding to i2q/I1.

From Eqs. (10) to (12) data i2q may be represented as:

$$\begin{aligned} i2q &= \overline{i1q}^*\cdot i1d - \overline{i1d}^*\cdot i1q \\ &= \sqrt{3/2}\ IM \sin(\theta I1^* - \theta I1) \\ &= I1 \sin \epsilon 1\phi \end{aligned} \quad (13)$$

Where $\epsilon1\theta = \theta I1^* - \theta I1$ (cf. FIG. 6). Thus from Eq. (13) and the relation "$\overline{i2q}=i2q/I1$", the data $\overline{i2q}$ can be expressed as:

$$\overline{i2q}=\sin \epsilon 1\phi \quad (14)$$

or $$\epsilon 1\phi = \sin^{-1}\overline{i2q} \quad (15)$$

Data $\overline{i2q}$ is converted by an arcsine circuit 473 into the phase error signal $\epsilon 1\phi$. The component I1 and the signal $\epsilon 1\phi$ thus obtained are applied to the comparator 250 of FIG. 3.

Incidentally, when the absolute value of a parameter x is very small, an approximation "sin x≈x" is established. Accordingly, when the phase error signal $\epsilon 1\phi$ is very small, signal $\epsilon 1\phi$ becomes close to $\overline{i2q}$ and arcsine circuit 473 may be omitted.

Figure 5C:
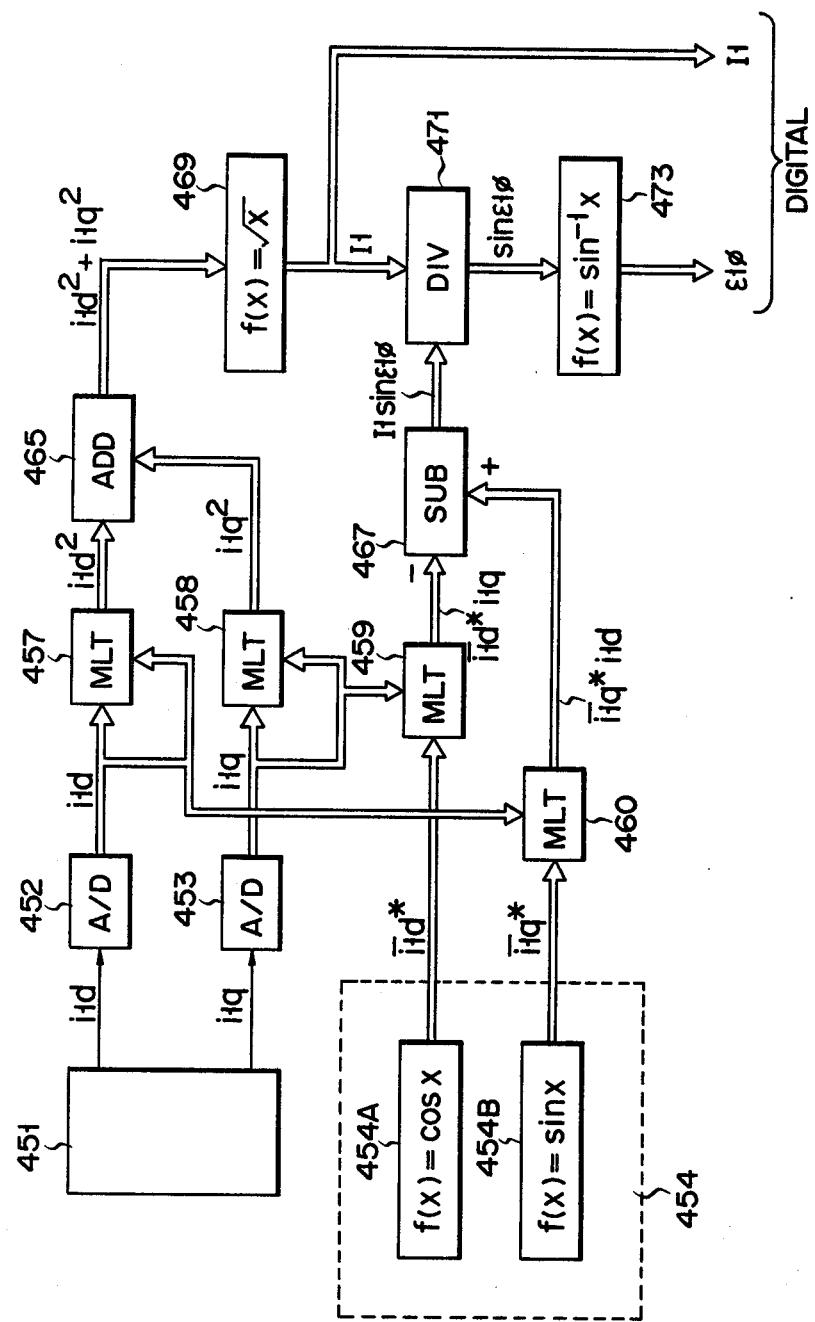
FIG. 5C is a modification (digital type) of the detector 450 of FIG. 5.

FIG. 5C shows a digital detector 450. First and second axis components i1d and i1q (analog) from the arithmetic unit 451 are converted by A/D converters 452 and 453 into digital data i1d and i1q, respectively. Data i1d is squared by a digital multiplier 457, and data i1q is squared by a digital multiplier 458. Output data i1d$^2$ of multiplier 457 and output data i1q$^2$ of multiplier 458 are added by a digital adder 465. Adder 465 outputs data i1d$^2$+i1q$^2$. Data i1d$^2$+i1q$^2$ is converted by a digital root function circuit 469 (ROM) into amplitude component data I1.

Data $\overline{i1d}^*$ from ROM 454A is multiplied by the data i1q by a digital multiplier 459. Data $\overline{i1q}^*$ from ROM 454B is multiplied by the data i1d by a digital multiplier 460. Output data $\overline{i1d}^*i1q$ of multiplier 459 is subtracted from output data $i1q^*i1d$ of multiplier 460 by a digital subtracter 467. Subtracter 467 outputs a data I1 sin $\epsilon 1\phi(=\overline{i1q}^*i1d-\overline{i1d}^*i1q)$. Data I1 sin $\epsilon 1\phi$ is divided by the data I1 by a digital divider 471. Output data sin $\epsilon 1\phi$ of divider 471 is converted by a digital arcsine circuit 473 into phase error data $\epsilon 1\phi$.

The current control apparatus having a configuration as shown in FIGS. 3 to 5 will operate as follows.

Instructor 150 provides an amplitude instruction I1* and a phase instruction $\theta$I1*. Instruction I1* is used as a reference of amplitude which designates the amplitude of a current instruction vector $\overline{I1}^*$. Instruction $\theta$I1* is used as a reference of phase which designates the phase angle of current vector $\overline{I1}^*$. Main control part 20 controls the three-phase AC currents of induction motor or load 600. When load currents i1U to i1W are sensed as signals s1U to s1W (Eq.(9)), operations based on the Eqs.(10) to (15) are carried out in the detector 450, and an actual amplitude signal I1 of the load current and an actual phase error signal $\epsilon 1\phi$ are obtained. The amplitude signal I1 and phase error signal $\epsilon 1\phi$ are shown in FIG. 6.

FIG. 6 is a vector graph showing the relation of phase and amplitude among current vectors and voltage vectors of the configuration of FIG. 3. In FIG. 6, symbols U, V and W indicate geometrical positions of the windings of load 600. Axes ds and qs define fixed rectangular coordinates. The current and voltage vectors are defined by polar coordinates whose origin is identical with that of the rectangular coordinates. The axis ds defines the reference axis (start line) of the polar coordinates. Thus, any of the vectors is defined by its absolute value and the angle formed between the vector and the reference axis. As is evident from FIG. 6, a current instruction vector $\overline{I1}^*$ can be reduced to a reference amplitude I1* (i.e., the length of $\overline{I1}^*$) and a reference phase angle $\theta$I1*.

Current vector $\overline{I1}^*$ is obtained by composing three-phase AC current instructions i1U* to i1W* (see FIG. 2). The vector $\overline{I1}^*$ has a given length I1* and rotates around the origin of polar coordinates with a given phase angle $\theta$I1*. Thus, a control of the polyphase AC currents may be made only by instructing the current vector $\overline{I1}^*$. There is no need to independently designate each of the current instructions $\overline{i1U}^*$ to $\overline{i1W}^*$. When the vector $\overline{I1}^*$ is projected on the axes of windings U, V and W, the images on these axes correspond to i1U*, i1V* and i1W* of FIG. 2 (cf. Eq.(2)).

The signals I1 and $\epsilon 1\phi$ are both DC and are applied to the comparator circuit 250. In the circuit 250, the absolute value I1* of the instruction current vector $\overline{I1}^*$ is compared with the absolute value $\overline{I1}$ of the actual load current vector I1 at the comparator 251, thus generating a DC amplitude error signal $\epsilon 1r$. The DC error signals $\epsilon 1r$ and $\epsilon 1\phi$ are converted into voltage instructions V1r* and V1$\phi$*. As shown in FIG. 6, instruction V1r* is inphase with the current vector $\overline{I1}^*$, and instruction V1$\phi$* is orthogonal to the vector $\overline{I1}^*$. The vector composed of instructions V1r* and V1$\phi$* corresponds to the voltage instruction vector $\overline{V1}^*$.

Instructions V1r* and V1$\phi$* are subjected to the functional conversion of Eq.(4) by the elements 352, 353, 356 and 358 of FIG. 4, and the amplitude value V1* of vector $\overline{V1}^*$ is determined. Instructions V1r* and V1$\phi$* are also subjected to the functional conversion of Eq.(5) by the elements 360, 362 and 364 of FIG. 4, and angle data $\phi$V1* indicating the angle formed between the vectors $\overline{V1}^*$ and $\overline{I1}^*$ is obtained. Data $\phi$V1* is added to phase angle data $\theta$I1* at adder 366, and voltage phase instruction $\theta$V1* is obtained according to Eq.(6). Instruction K2V1* and the unit voltage instructions v1U* to v1W* are multiplied, and AC voltage instructions $\overline{v1U}^*$ to $\overline{v1W}^*$ are generated according to Eq.(8).

Instructions v1U*, v1V* and v1W* respectively correspond to a U winding component, V winding component and W winding component of the load 600. Thus, these instructions v1U* to v1W* are three-phase AC instructions and are used for controlling the cycloconverter 500. Cycloconverter 500 generates three-phase AC voltages v1U to v1W according to the instructions v1U* to v1W*, and three-phase AC currents i1U to i1W flow into the load 600.

In the configuration of FIG. 3, when I1*≠I1 and/or $\theta$I1*≠$\theta$I1, the amplitude error $\epsilon 1r$ and/or the phase error $\epsilon 1\phi$ appear. When each of the amplifiers 255 and 256 includes an integration element, the DC feedback control operates to reduce the errors $\epsilon 1r$ and $\epsilon 1$, resulting in I1*=I1 and $\theta$I1*=$\theta$I1. Namely, the actual current vector $\overline{I1}$ becomes identical to the current instruction vector $\overline{I1}^*$ with no stationary amplitude error $\epsilon 1r$ and no stationary phase error $\epsilon 1\phi$. In other words, the actual AC load currents i1U to i1W are so controlled that these AC load currents completely follow the inputted instructions I1* and $\theta$I1* (or Vf1*) without any errors, regardless of the frequency of AC load currents. The current control apparatus of the invention, therefore, can completely avoid the prior art problems due to an AC feedback control.

In the current control apparatus of the invention, an amplitude control loop in which an amplitude error $\epsilon 1r$ is obtained by comparing data I1* and I1 is separated from a phase control loop in which a phase error $\epsilon 1\phi$ is obtained by comparing data $\theta$I1* and $\theta$I1. Thus, a transfer function of the amplitude control loop can be completely independent of a transfer function of the phase control loop. Accordingly, when the traceability of the phase of AC load currents with respect to the control instruction Vf1* or $\theta$I1* is to be improved with regard to a transient response characteristic, the characteristic of the phase error amplifier 256 is adjusted independent of the adjustment of the amplitude error amplifier 255. Or, when the traceability of the amplitude of AC load currents with respect to the control instruction I1* is to be most significant, the amplitude error amplifier 255 is preferentially adjusted. This feature (independent adjustment of phase and amplitude) is quite important.

Figure 7:
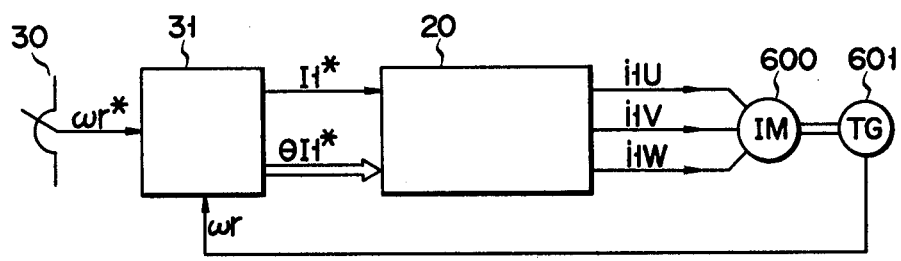
FIG. 7 shows a configuration for actuating an induction motor by means of a vector control utilizing the present invention.

FIG. 7 shows one application of the main control part 20 of FIG. 3 in which an induction motor 600 is vector-controlled according to the present invention. In FIG. 7 a speed designator 30 provides a vector controller 31 with a rotational speed command $\omega r^*$. The actual rotational speed of the motor 600 is detected as a speed signal $\omega r$ by a tachometer 601. Controller 31 generates the DC amplitude instruction I1* and the 7 AC phase instruction $\theta$I1* according to the command $\omega r^*$ and the signal $\omega r$. Instructions I1* and $\theta$I1* determine a target current vector $\overline{I1}^*$ as shown in FIG. 6. How an armature current vector $\overline{I1}$ of the motor 600 exactly follows the target vector $\overline{I1}^*$ is a key point of the feedback control. Details of this system are discussed in IEEE Vol. IA-16, No. 3, May/June, 1980, pp. 342-350.

Figure 8:
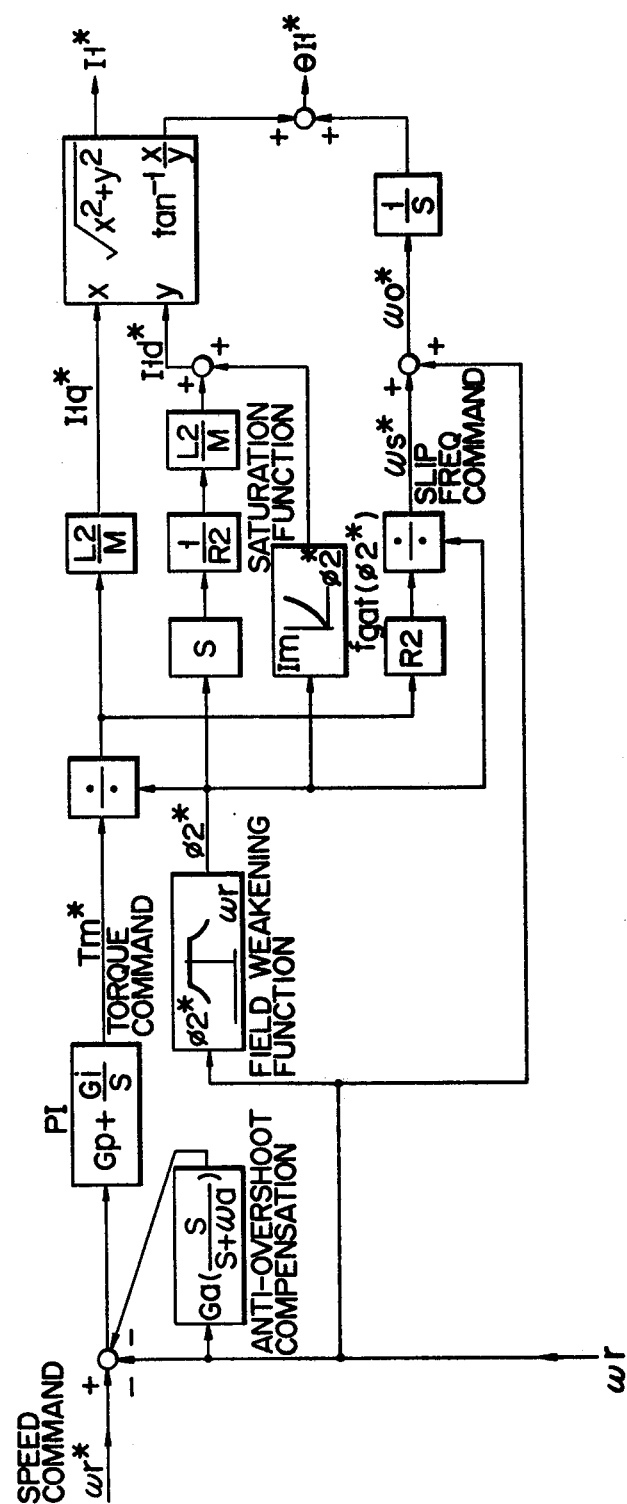
FIG. 8 shows details of a vector controller 31 of FIG. 7.

FIG. 8 shows details of the vector controller 31 of FIG. 7. FIG. 7 corresponds to the combination of FIGS. 1 and 2 of the paper:

R. Kurosawa et al. "A MICROCOMPUTER-BASED HIGH POWER CYCLOCONVERTER-FED INDUCTION MOTOR DRIVE", Industry Applications Society, IEEE JAS-1972 Annual Meeting, pp. 462-463

Explanations for the configuration of FIG. 8 are therefore omitted.

Although specific configurations have been illustrated and described herein, it is not intended that the invention be limited to the elements and configurations disclosed. A person skilled in the art will recognize that other particular elements or subconfigurations may be used without departing from the scope of the present invention. For instance, the present invention can be applied to the circuits 44, 46, 62 to 66 of U.S. Pat. No. 4,259,629 issued on Mar. 31, 1981 titled "Control Devices of Induction Motors". All disclosures of this U.S. Patent are combined herewith.

The present invention is applicable not only to a single-phase load but also to any polyphase (two or more phase) load.

Where actual information of the load 600, e.g., a counter electromotive force, is predictable or detectable, such actual information can be reduced to an axial component of instruction vector $\overline{I1}^*$ corresponding to the instruction $V1r^*$ and to an orthogonal component thereof corresponding to the instruction $V1\phi^*$. These reduced components may be added to or subtracted from the instructions $V1r^*$ and $V1\phi^*$. Then, these instructions $V1r^*$ and $V1\phi^*$ with the reduced components may be used as the input data of control circuit 350.

As mentioned above, according to the present invention, any stationary errors of phase and amplitude between the control target values and the actual values of polyphase load currents can be completely avoided. Further, transient errors of phase and amplitude of the load currents can be noticeably reduced. This is because the transfer function of a phase control loop is independent of the transfer function of an amplitude control loop, and the phase adjustment can be free from the amplitude adjustment. Accordingly, present invention offers the best approach to improve not only stationary and transient control characteristics but also to improve the stability of the control loop.

What we claim is:

1. A current control apparatus for electric power systems, comprising:
   first means for providing a DC amplitude instruction and an AC phase instruction;
   second means responsive to voltage instructions for supplying a load with AC load currents;
   third means coupled to said first and second means for generating a DC phase error signal according to the phase difference between a phase angle of a composed vector of said AC load currents and that of said AC phase instruction, and for generating a DC amplitude signal according to the sum of the square of a cosine component of said AC load currents and the square of a sine component of said AC load currents;
   fourth means coupled to said first and third means for generating a first voltage instruction which corresponds to the difference between said DC amplitude instruction and said DC amplitude signal, and for generating a second voltage instruction which corresponds to said DC phase error signal; and
   fifth means coupled to said second and fourth means for generating said voltage instructions according to said first and second voltage instructions.

2. The apparatus of claim 1 wherein said third means includes:
   sensor means for sensing said AC load currents and converting the sensed load currents into sensed signals;
   first arithmetic means coupled to said sensor means for converting said sensed signals into said cosine component and said sine component; and
   second arithmetic means coupled to said first arithmetic means and to said fourth means for converting said cosine and sine axis components into said DC amplitude signal which corresponds to the root of the sum of the squared cosine component and the squared sine component.

3. The apparatus of claim 2 wherein said third means further includes:
   first function means coupled to said first means for converting said AC phase instruction into a unit cosine signal and a unit sine signal;
   third arithmetic means coupled to said first arithmetic means and to said first function means for producing a first signal from said unit cosine and unit sine signals and from said sine and cosine components, said first signal corresponding to the difference between the product of said unit sine signal and cosine component and the product of said unit cosine signal and sine component; and
   second function means coupled to said fourth means, to said second arithmetic means and to said third arithmetic means, for converting said DC amplitude signal and said first signal into said DC phase error signal which corresponds to the arcsine of the quotient of said first signal to said DC amplitude signal.

4. The apparatus of claim 1 wherein said fourth means includes:
   comparator means coupled to said first means and to said third means and responsive to said DC amplitude instruction and to said DC amplitude signal, for providing a DC amplitude error signal which corresponds to the difference between said DC amplitude instruction and said DC amplitude signal; and
   first amplifier means coupled to said comparator means and to said fifth means for amplifying said DC amplitude error signal to provide said first voltage instruction, said first amplifier means including an integration element for removing a stationary amplitude error of the DC feedback control of the current control apparatus.

5. The apparatus of claim 2 wherein said fourth means includes:
   comparator means coupled to said first means and to said third means and responsive to said DC amplitude instruction and to said DC amplitude signal, for providing a DC amplitude error signal which corresponds to the difference between said DC amplitude instruction and said DC amplitude signal; and
   first amplifier means coupled to said comparator means and to said fifth means for amplifying said DC amplitude error signal to provide said first voltage instruction, said first amplifier means including an integration element for removing a stationary amplitude error of the DC feedback control of the current control apparatus.

6. The apparatus of claim 3 wherein said fourth means includes:
   comparator means coupled to said first means and to said third means and responsive to said DC amplitude instruction and to said DC amplitude signal, for providing a DC amplitude error signal which corresponds to the difference between said DC amplitude instruction and said DC amplitude signal; and
   first amplifier means coupled to said comparator means and to said fifth means for amplifying said DC amplitude error signal to provide said first voltage instruction, said first amplifier means including an integration element for removing a stationary amplitude error of the DC feedback control of the current control apparatus.

7. The apparatus of claim 1 wherein said fourth means includes:
   second amplifier means coupled to said third and fifth means for amplifying said DC phase error signal to provide said second voltage instruction, said second amplifier means including an integration element for removing a stationary phase error of the DC feedback control of the current control apparatus.

8. The apparatus of claim 2 wherein said fourth means includes:
   second amplifier means coupled to said third and fifth means for amplifying said DC phase error signal to provide said second voltage instruction, said second amplifier means including an integration element for removing a stationary phase error of the DC feedback control of the current control apparatus.

9. The apparatus of claim 3 wherein said fourth means includes:
   second amplifier means coupled to said third and fifth means for amplifying said DC phase error signal to provide said second voltage instruction, said second amplifier means including an integration element for removing a stationary phase error of the DC feedback control of the current control apparatus.

10. The apparatus of claim 4 wherein said fourth means includes:
    second amplifier means coupled to said third and fifth means for amplifying said DC phase error signal to provide said second voltage instruction, said second amplifier means including an integration element for removing a stationary phase error of the DC feedback control of the current control apparatus.

11. The apparatus of any one of claims 1 to 10 wherein said fifth means includes:
    fourth arithmetic means coupled to said fourth means for providing a second signal from said first and second voltage instructions, said second signal corresponding to the radical of the sum of the squared first voltage instruction and the squared second voltage instruction;
    fifth arithmetic means coupled to said fourth means for providing a voltage angle signal which corresponds to the arctangent of the quotient of said second voltage instruction to said first voltage instruction; and
    third function means coupled to said first, second, fourth and fifth means and being responsive to said second signal, to said voltage angle signal and to said phase instruction, for generating said voltage instructions.

* * * * *